United States Patent [19]
Imazato et al.

[11] Patent Number: 5,906,536
[45] Date of Patent: May 25, 1999

[54] POWDER SEALING DEVICE OF POWDER BEAM PROCESSING MACHINE

[75] Inventors: Minehisa Imazato, Tokyo, Japan; Masahiro Otsuka; Kazuhiko Otsuka, both of Chiba, Japan

[73] Assignee: Sony Corporation, Tokyo, Japan

[21] Appl. No.: 08/807,587

[22] Filed: Feb. 27, 1997

[30] Foreign Application Priority Data

Feb. 29, 1996 [JP] Japan .................................. 8-067427

[51] Int. Cl.⁶ ....................................................... B24C 9/00
[52] U.S. Cl. ................................................. 451/89; 451/75
[58] Field of Search ................................... 451/2, 38, 39, 451/40, 65, 75, 78, 80, 89, 36, 37, 102; 269/15, 289 R, 302.1; 156/345; 216/66

[56] References Cited

U.S. PATENT DOCUMENTS

| | | |
|---|---|---|
| 3,510,177 | 5/1970 | Shimula et al. . |
| 5,009,435 | 4/1991 | Villanyi et al. . |
| 5,397,421 | 3/1995 | Fujutani .................................. 156/345 |
| 5,423,713 | 6/1995 | Mishima .................................... 451/36 |
| 5,486,128 | 1/1996 | Tsuchiya et al. . |

FOREIGN PATENT DOCUMENTS

| | | |
|---|---|---|
| 0 173 788 A2 | 3/1986 | European Pat. Off. . |
| 91 01 497 | 6/1992 | Germany . |
| 44 41 653 C1 | 11/1995 | Germany . |
| 2 058 960 | 4/1981 | United Kingdom . |
| 2 140 102 | 11/1984 | United Kingdom . |

*Primary Examiner*—David A. Scherbel
*Assistant Examiner*—Derris Holt Banks
*Attorney, Agent, or Firm*—Hill & Simpson

[57] ABSTRACT

A powder sealing device of a powder beam processing machine including a processing chamber for processing a workpiece by jetting powder beams to the workpiece, includes: a thin film cylinder member for sealing a space between an operating shaft passing through an opening portion formed in a peripheral surface of the processing chamber and the opening portion; and a substantially cylindrical mounting bracket having a small chamber communicated to the processing chamber and mounted to the opening portion. The thin film cylinder member is formed of a flexible thin film material into a substantially conical shape, and has one end mounted to one end of the mounting bracket on the opening portion side and the other end mounted to the outer peripheral side of the operating shaft. When the processing chamber is in a negative pressure state, an intermediate portion of the conical thin film cylinder member is expandedly sucked inward of the small chamber without generation of any wrinkle, so that it is possible to structurally eliminate breakage of the thin film cylinder member and hence to prolong the service life of the powder sealing device.

8 Claims, 4 Drawing Sheets

POWDER SEALING DEVICE OF POWDER BEAM PROCESSING MACHINE

BACKGROUND OF THE INVENTION

The present invention relates to a powder sealing device of a powder beam processing machine for processing a workpiece by jetting a powder beam to the workpiece, more specifically, by allowing a solid/gas two-phase flow containing a powder (fine particles) in a high speed gas flow to collide with the workpiece.

A variety of powder beam processing machines have been known of a type in which a workpiece mounted on a pallet is processed by jetting a solid/gas two-phase flow containing a powder in a high speed gas flow to the workpiece. Such a machine includes, in a processing chamber, a processing table; a workpiece mounting pallet fixed on the processing table; and a processing nozzle for jetting a solid/gas two-phase flow to the workpiece mounted on the pallet, wherein the workpiece is processed by setting a positional relationship between the processing nozzle and the workpiece mounted on the pallet by relative movement of the processing table and the processing nozzle, and by jetting the solid/gas two-phase flow from the processing nozzle to a suitable position on the surface of the workpiece. The above-described relative movement of the processing table and the processing nozzle is adjusted outside the processing chamber via an operating shaft passing through the processing chamber. In such a machine, a powder sealing means is provided for preventing the powder from being leaked to the outside from a portion through which the operating shaft passes.

FIG. 1 is a typical view showing one example of a powder sealing device of a related art powder beam processing machine. In this figure, reference numeral 101 indicates an outer wall surface of a processing chamber; 102 is a rectangular cylinder body defining an opening portion in the outer wall surface 101; 103 is an operating shaft 103 extending from the outside to the inside of the processing chamber while passing through the cylinder body 102; and 104 is a thin film cylinder member formed of a flexible thin film material. With respect to the thin film cylinder member 104, one end portion thereof is formed into a rectangular shape and is air-tightly fixed around the outer periphery of the opening portion of the cylinder body 102, and the other end portion thereof is air-tightly mounted on the operating shaft 103 side. The thin film cylinder member 104 is adapted to seal the opening portion of the cylinder body 102 through which the operating shaft 103 passes.

In a powder beam processing machine, the thin film cylinder member 104 is generally drawn on the processing chamber side by a negative pressure generated in the processing chamber; however, since the opening portion of the cylinder body 102 in the related art powder beam processing machine is formed in a rectangular shape, the thin film cylinder member 104 becomes wrinkled by the corners of the opening portion, and the wrinkled portions are liable to be broken.

Since the related art powder beam processing machine does not include any means for discharging the powder having entered the thin film cylinder member 104 through the opening portion, the weight of the powder having entered the thin film cylinder member 104 is applied as a load to the thin film cylinder member 104, leading to such an inconvenience that the thin film cylinder member 104 may be broken or a mounting portion may be loosened.

In such a powder beam processing machine, a powder detecting sensor is provided near the thin film cylinder member 104 for detecting, if the thin film cylinder member 104 is broken, or if there is leakage of the powder from the thin film cylinder member 104. However, since the powder detecting sensor is provided in the atmospheric air, the powder leaked in the atmospheric air flies up in the air, and thereby it is difficult to detect the leakage of the powder, resulting in the poor detection accuracy.

SUMMARY OF THE INVENTION

An object of the present invention is to provide a powder sealing device of a powder beam processing machine, which has a configuration capable of improving a sealing performance.

To achieve the above object, according to the present invention, there is provided a powder sealing device of a powder beam processing machine including a processing chamber for processing a workpiece by jetting powder beams to the workpiece, including: a thin film cylinder member for sealing a space between an operating shaft passing through an opening portion formed in a peripheral surface of the processing chamber and the opening portion; and a substantially cylindrical mounting bracket having a small chamber communicated to the processing chamber and mounted to the opening portion; wherein the thin film cylinder member is formed of a flexible thin film material into a substantially conical shape, the thin film cylinder member having one end mounted to one end of the mounting bracket on the opening portion side and the other end mounted to the outer peripheral side of the operating shaft; whereby when the processing chamber is in a negative pressure state, an intermediate portion of the thin film cylinder member is expandedly sucked inward of the small chamber.

With this configuration in which the thin film cylinder member is formed in a conical shape, when an intermediate portion of the thin film cylinder member is sucked on the processing chamber side, the thin film cylinder member is held in the small chamber in an expanded state without generation of any wrinkle. This makes it possible to structurally eliminate generation of damages of the thin film cylinder member, and hence to prolong the service life of the powder sealing device.

The above thin film cylinder member preferably has a double cylinder structure in which an outer thin film cylinder member is provided around an inner thin film cylinder member with a gap put therebetween for holding the inner thin film cylinder member in a state being expendedly sucked in the small chamber. With this configuration, only the inner thin film cylinder member is expandedly sucked in the small chamber by a negative pressure and the outer thin film cylinder member is left as it is, so that it is possible to improve the appearance characteristic, to increase the strength, and to enhance the reliability.

The powder sealing device of the present invention may include a sensor provided in the gap between the outer thin film cylinder member and the inner thin film cylinder member for detecting the powder having entered the gap resulting from breakage of the inner thin film cylinder member. With this configuration, before being diffused in the air, the powder leaked in the gap can be detected by the sensor, thereby making it possible to detect the powder in a slight amount and hence to improve the detection accuracy. In addition, when the inner thin film cylinder member is broken, the powder is leaked not to the outside of the outer thin film cylinder member but only in the gap, so that it is possible to prevent contamination of the inside of the entire facility.

The powder sealing device of the present invention may further include a means for discharging the powder having entered the small chamber. With this configuration, the powder having entered the small chamber is sequentially discharged through the discharge port. This prevents the inner thin film cylinder member from being broken by the weight of the accumulated powder, or prevents the mounting portion from being removed by the weight of the accumulated powder, thereby improving reliability.

In the powder sealing device of the present invention, the size of the opening portion may be set at a minimum value corresponding to an operating range of the operating shaft. With this configuration, it is possible to minimize the amount flowing from the processing chamber into the small chamber.

As described above, according to the present invention, the sealing performance for a powder can be improved with a simple structure, and the service life of a sealing member can be improved; and further, even if a powder is leaked, such a leakage is immediately detected, so that the powder can be prevented from being leaked to the outside, resulting in the enhanced reliability.

BRIEF DESCRIPTION OF THE INVENTION

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
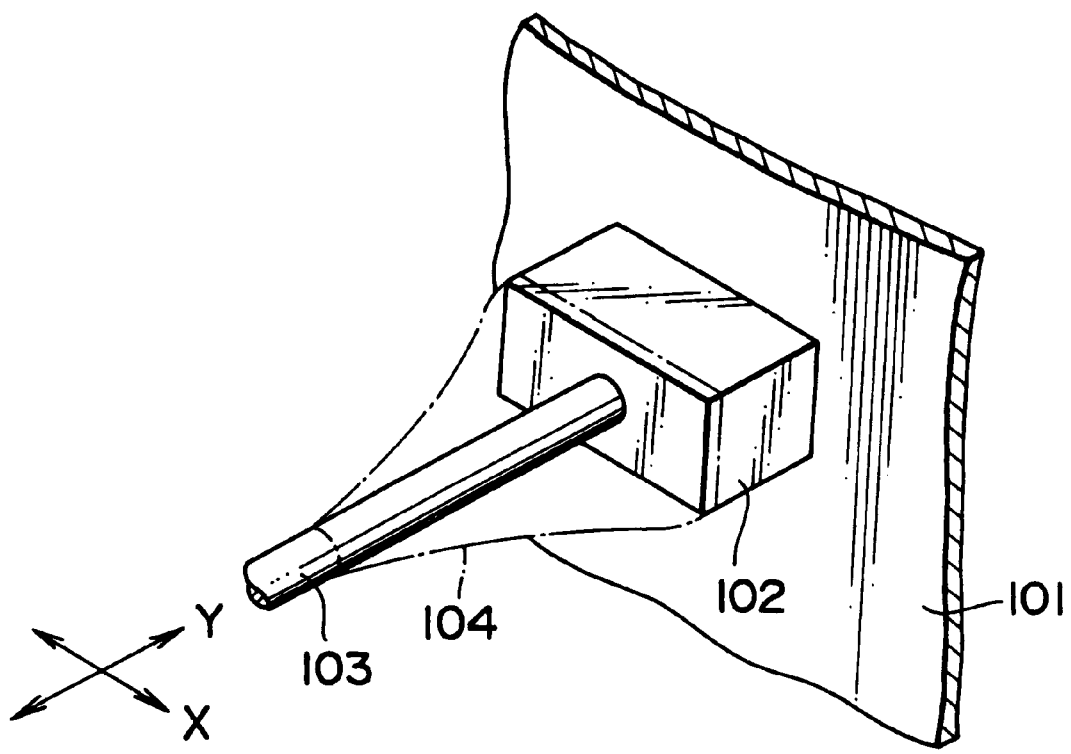
FIG. 1 is a schematic perspective view showing one example of a related art powder sealing device.
Figure 2:
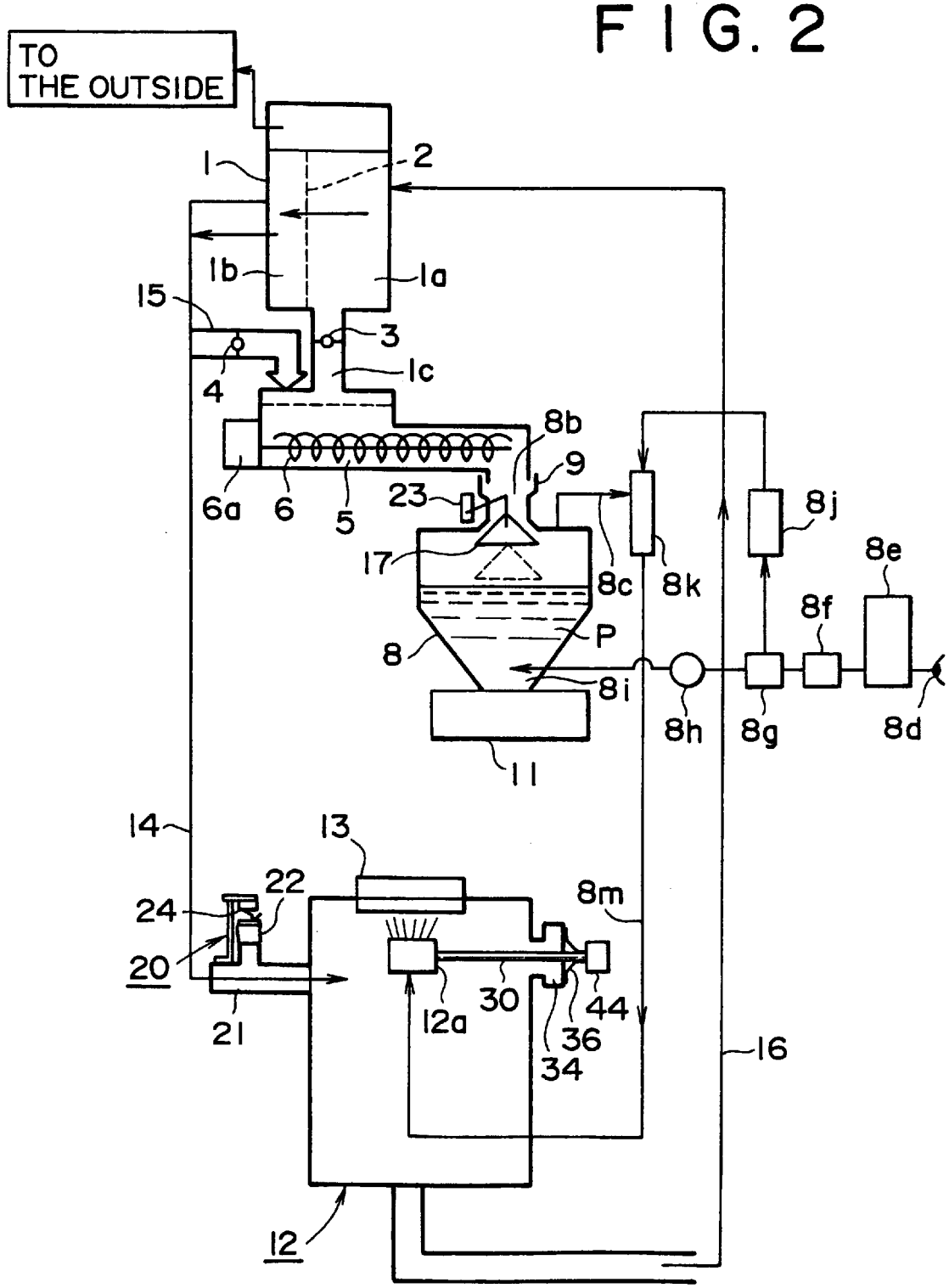
FIG. 2 is a system diagram of one embodiment of a powder beam processing machine according to the present invention.

FIG. 2 is a system diagram of one embodiment of a powder beam processing machine according to the present invention. With reference to this figure, the entire configuration and the operation of the powder beam processing machine will be described before the description of a detailed structure of a powder sealing device of the present invention.

The powder beam processing machine shown in FIG. 2, in which a powder is jetted at a high speed to a workpiece, is used for a variety of applications. One of the applications is to accurately etch a hard and brittle material such as ferrite, glass or ceramics at a high speed by making use of a collision energy generated when the powder collides with the target material.

In FIG. 2, reference numeral 1 indicates an exhauster 1 as a separating means for separating a solid/gas two-phase flow into a powder and an air. The exhauster 1 is divided into small chambers 1a, 1b by a filter 2. The bottom portion of the small chamber 1a is connected to a connection portion 1c containing a butterfly valve 3 for opening/closing the connection portion 1c.

The small chamber 1a is also connected to a powder beam processing chamber 12 side by way of a path 16. A solid/gas two-phase flow in which a powder is mixed with an air is supplied from the processing chamber 12 to the exhauster 1. The powder in the solid/gas two-phase flow remains in the small chamber 1a by the filter 2, and it is supplied on a reserve tank 5 side via the connection portion 1c. The air passing through the filter 2 is supplied on the processing chamber 12 side through the small chamber 1b and a path 14, with part of the air discharged to the outside. A detector 20 is mounted in the path 14 at a position directly before the processing chamber 12. When the inside of the processing chamber 12 becomes a positive pressure state, such a state is detected by the detector 20.

The detector 20 includes a cylindrical portion 21 communicated to the processing chamber 12, a flexible bellows portion 22 branched from an intermediate portion of the cylindrical portion 21, and a microswitch 24 provided adjacent to the outside of the bellows portion 22. When the inside of the processing chamber 12 is in a negative pressure state, the bellows portion 22 is contracted and the microswitch 24 is turned on (or off). Besides, when the inside of the processing chamber 12 becomes a positive pressure state, the bellows portion 22 is expanded and the microswitch 24 is turned off (or on). Accordingly, when the inside of the processing chamber 12 becomes a positive pressure state due to, for example, a failure of the exhauster 1, such a state can be readily detected on the basis of a signal from the detector 20.

The reserve tank 5 functions as a means for temporarily reserving the powder separated by the exhauster 1, and it contains a screw device 6.

The small chamber 1b of the exhauster 1 is connected to the reserve tank 5 via a path 15 as a gas introducing means containing a butterfly valve 4 as an opening/closing valve. The path 15 can be opened/closed by operating the butterfly valve 4. The opening of the path 15 allows a high pressure air to be supplied from the small chamber 1b of the exhauster 1 into the reserve tank 5. The screw device 6 can supply the powder reserved in the reserve tank 5 to the mixing tank 8 side via an isolator 9 by rotation of a screw 6a. The mixing tank 8 functions as a means for mixing the powder supplied from the reserve tank 5 with a high pressure air. The weight of the powder in the mixing tank 8 can be accurately measured by an electronic force balance 11. Namely, the electronic force balance 11 can measure the weight of the powder reserved in the mixing tank 8, and for example, if the measured value of the electronic force balance 11 is 2 kg, it indicates the amount of the powder capable of performing powder beam processing for a period of time ranging from about 30 to 60 min.

The isolator 9 is provided to mechanically separate the reserve tank 5 from the mixing tank 8 (floating line L) for measuring the weight of the powder P in the mixing tank 8, and a passage 8b of the isolator 9 can positively supply the powder from the reserve tank 5 to the mixing tank 8 side.

The mixing tank 8 has a triangular valve 17 as an opening/closing valve in an upper opening portion of the mixing tank 8. The powder P in the mixing tank 8 is blown up in an upper path 8c by supply of an air with a specified high pressure from bottom to top. The means for supplying the air having the specified high pressure will be described below.

A supply air 8d is supplied to a lower portion 8i of the mixing tank 8 by way of a dry air unit 8e, a flow rate sensor 8f, branch portion 8g, and a regulator 8h. The dry air unit 8e is adapted to dry the supply air 8d, and the flow rate sensor 8f is adapted to measure the flow rate of the dried air. The branch portion 8g is adapted to branch the high pressure air thus dried into the regulator 8h and a flow rate control unit 8j. The dried high pressure air supplied to the flow rate control unit 8j is supplied to an ejector 8k. The ejector 8k functions as a means for mixing the dried high pressure air with a powder blown up from the mixing tank 8 into the path 8c and acceleratedly supplying the mixture into a jetting nozzle 12a. Namely, the solid/gas two-phase flow accelerated from the ejector 8k is supplied into the jetting nozzle 12a in the processing chamber 12 through a path 8m. In addition, the pressure of the high pressure air supplied to the lower portion 8i of the mixing tank 8 is in a range of, for example, from 0.5 to 3.5 kg/cm². The triangular valve 17 is so configured as to be opened only for supplying the powder from the reserve tank 5 to the mixing tank 8.

The operation of the above-described powder beam processing machine will be described below. It is to be noted that the powder used in this embodiment has an average particle size ranging, for example, from about 3 to 11.5 μm. First, a workpiece 13, which is typically a substrate having a resist pattern, is set on a processing table (not shown) positioned on an upper portion in the processing chamber 12. On the other hand, a powder P in the mixing tank 8 is supplied into the jetting nozzle 12a via the ejector 8k and the path 8m. The jetting nozzle 12a is mounted at the leading end of an operating shaft 30 extending from the outside from the inside of the processing chamber 12 while passing through an opening portion formed in the outer peripheral surface of the processing chamber 12. After the jetting nozzle 12a is moved with respect to the workpiece 13 (substrate) by operation of the operating shaft 30, the air containing the powder P is jetted on a desired position of the workpiece 13, so that the surface of the workpiece 13 is etched on the basis of a resist pattern by powder beams.

The powder jetted on the workpiece 13 (substrate) is dropped on the bottom portion of the processing chamber 12, and is supplied onto the exhauster 1 side through the path 16. The filter 2 separates the powder from the high pressure air, and allows the powder P to remain in the small chamber 1a. The high pressure air is supplied into the processing chamber 12 through the path 14. The powder remaining in the small chamber 1a is supplied into the reserve tank 5 through the connection portion 1c in a state that the butterfly valve 3 is opened and the butterfly valve 4 is closed. In such a state, the screw device 6 is stopped and the triangular valve 17 is also closed.

The reason why the butterfly valve 4 in the path 15 is thus closed when the powder P is supplied from the exhauster 1 into the reserve tank 5, is that if the butterfly valve 4 in the path 15 is opened, the air to the small chamber 1b flows into both the reserve tank 5 and the processing chamber 12 and thereby the sucked amount of the high pressure air from the processing chamber 12 side is reduced. Accordingly, in the case where the powder is supplied from the exhauster 1 into the reserve tank 5, the butterfly valve 4 is closed for preventing reduction in recovery of the powder.

The powder P, which is reserved in the reserve tank 5, is prepared to be supplied from the reserve tank 5 into the mixing tank 8. In such a preparation step, the butterfly valve 3 is closed and the butterfly valve 4 is opened, and the screw device 6 is stopped and the triangular valve 17 is opened. Then, by rotation of the screw device 6 of the reserve tank 5, the powder P in the reserve tank 5 is supplied into the mixing tank 8 through the path 8b in the isolator 9. At this time, the butterfly valve 3 is closed and the butterfly valve 4 is opened.

The opening of the path 15 by the butterfly valve 4 can prevent the following phenomenon. If the butterfly valve 4 in the path 15 is closed, there occurs such a phenomenon that the powder P in the reserve tank 5 couterflows to the exhauster 1 side through a small gap of the butterfly valve 3 of the connection portion 1c, and particularly, the powder P couterflows to the outside through the isolator 9 over the triangular valve 17 in the mixing tank 8 or returns into the reserve tank 5. To cope with such an inconvenience, the butterfly valve 4 in the path 15 is opened so that the high pressure air from the small chamber 1b of the exhauster 1 is positively introduced into the reserve tank 5 for preventing the powder from couterflowing through the gap of the butterfly valve 3 or from counterflowing to the outside from the isolator 9 of the mixing tank 8.

The solid/gas two-phase flow in which the powder is mixed with the high pressure air is separated into the powder and the air by means of the filter 2 of the exhauster 1, and the separated powder P is positively recovered into the mixing tank 8 through the reserve tank 5. The powder (fine particles) P recovered into the mixing tank 8 can be jetted again onto the workpiece 13 using the jetting nozzle 12a in the processing chamber 12.

Figure 3:
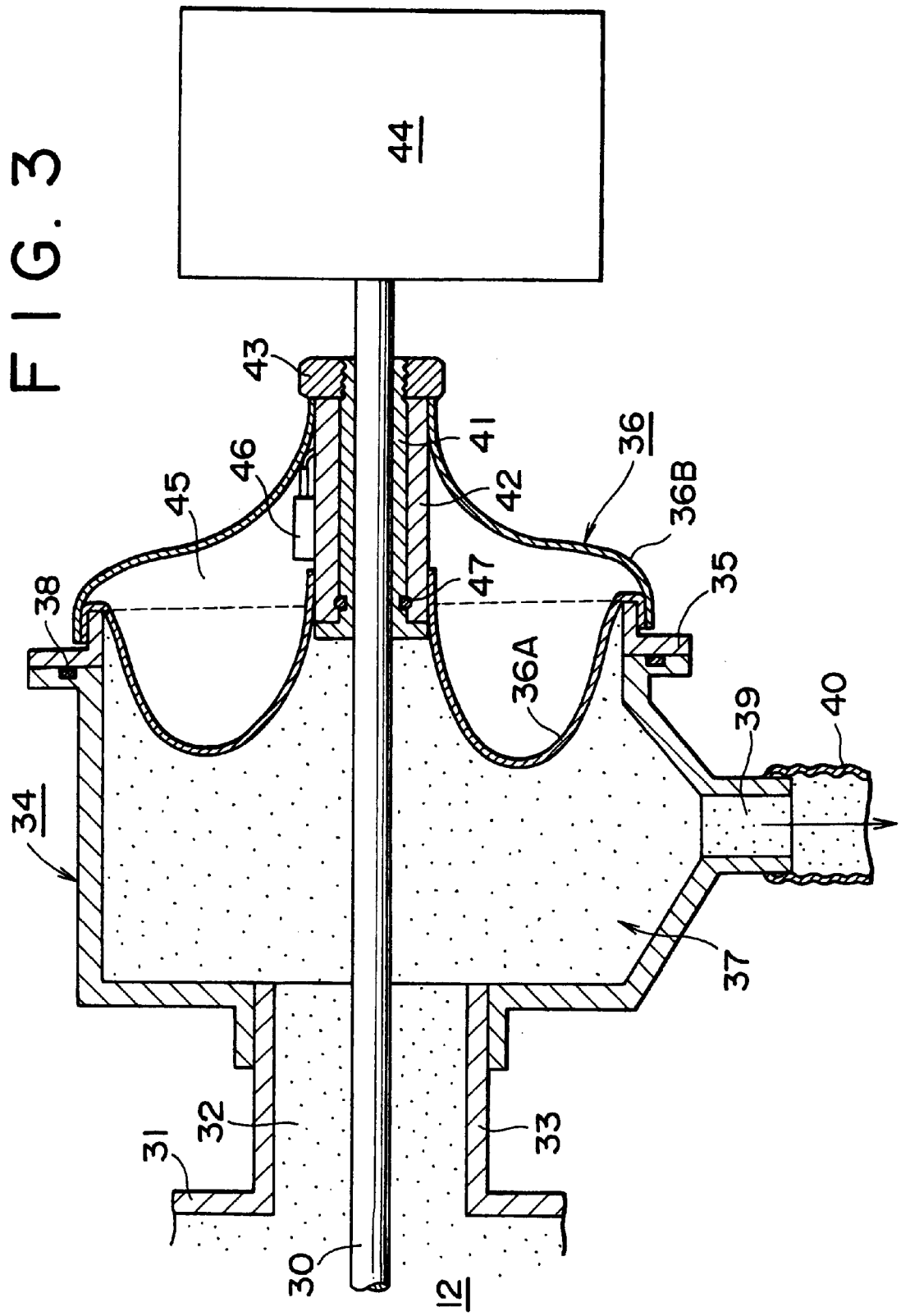
FIG. 3 is an enlarged sectional view of essential portions of one embodiment of a powder sealing device according to the present invention.
Figure 4:
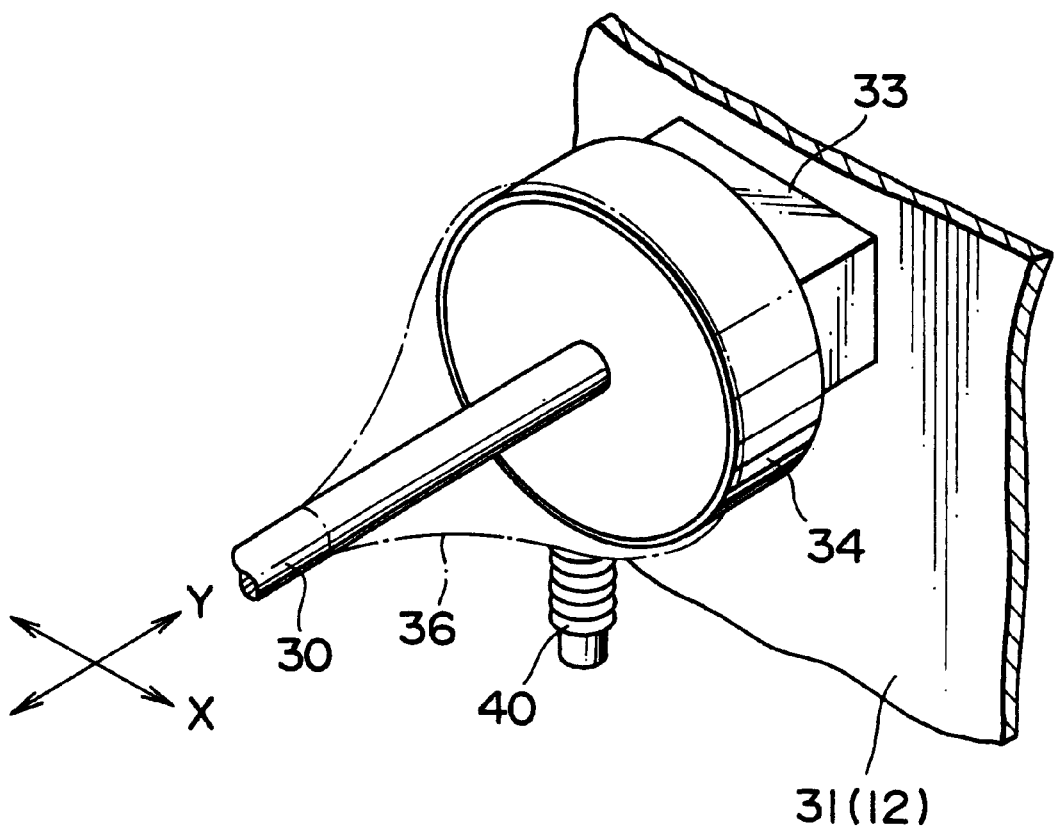
FIG. 4 is a schematic perspective view of the essential portions of the powder sealing device shown in FIG. 3.

FIGS. 3 and 4 show a detail structure of the powder sealing device at a portion where the operating shaft 30 for operating the jetting nozzle 12a is disposed, wherein FIG. 3 is an enlarged sectional view showing essential portions of the detailed structure, and FIG. 4 is a schematic perspective view of the essential portions shown in FIG. 3.

In FIGS. 3 and 4, a cylinder body 33 defining an opening portion 32 through which the operating shaft 30 passes is integrally formed on an outer wall surface 31 of the processing chamber 12. The cylinder body 33 has a minimum size corresponding to movement of the operating shaft 30 in the X, Y directions for minimizing a powder leaked to the outside of the processing chamber 12 through the opening portion 32.

Reference numeral 34 in FIG. 4 indicates a mounting bracket formed in a substantially short sized cylinder shape and containing a small chamber 37. With respect to the mounting bracket, one end thereof is air-tightly mounted to the opening portion 32 of the cylinder body 33, and the other end thereof is air-tightly mounted with a thin film cylinder member 36 via a flange member 35. In addition, reference numeral 38 indicates a sealing O-ring interposed between the mounting bracket 34 and the flange member 35. The lower side of the mounting bracket 34 has at the center portion a discharge port 39 for discharging the powder having entered the small chamber 37 and having being sedimented or precipitated therein. A discharging hose 40 is mounted at the leading end of the discharge port 39. In addition, the hose 40 has an opening/closing valve (not shown) and is communicated to the small chamber 37 through the opening/closing valve.

Reference numeral 41 indicates a cylindrical bearing member for slidably holding the operating shaft 30, and 42 is a cylindrical retainer mounted around the outer periphery of the bearing member 41. The retainer 42 is removably mounted on the bearing member 41 by means of a nut 43 screwed with the end portion of the bearing member 41. The operating shaft 30 is slidably mounted in the bearing member 41 while passing through the center of the bearing member 41. The other end of the rotating shaft 30 positioned outside the processing chamber 12 is mounted with a drive mechanism 44 for moving the operating shaft 30 together with the jetting nozzle 12a (see FIG. 2).

The thin film cylinder member 36 is composed of an inner thin film cylinder member 36A and an outer thin film cylinder member 36B each of which is formed of a flexible thin film material into a substantially conical shape. One end of the inner thin film cylinder member 36A is air-tightly mounted around the outer periphery of the flange member 35, and the other end thereof is air-tightly mounted around the outer periphery of one end portion of the retainer 42. The inner thin film cylinder member 36A is so configured as to be loosened at the intermediate portion thereof. In general, the processing chamber 12 is in a negative pressure state by operation of the exhauster 1, and the intermediate portion of the inner thin film cylinder member 36A is expandedly sucked inward of the small chamber 37 by the negative pressure as shown in FIG. 3.

On the contrary, one end of the outer thin film cylinder member 36B is mounted around the outer periphery of the flange member 35 and the other end thereof is mounted around the outer periphery of the other end of the retainer 42.

A gap (space) 45 having a slight air-tightness is formed between the inner thin film cylinder member 36A and the outer thin film cylinder member 36B. A sensor 46 for detecting the powder is disposed in the gap 45 in such a manner as to be mounted on the outer periphery of the retainer 42. A photosensor for detecting a powder is used as the sensor 46; however, other sensor structures may be used. In addition, reference numeral 47 indicates a sealing O-ring interposed between the bearing member 41 and the retainer 42.

In the powder sealing device or structure in this embodiment, since the thin film cylinder member 36 is formed in a substantially conical shape, when the inner thin film cylinder member 36A is sucked on the processing chamber 12 side in the small chamber 37 by a negative pressure, it is held in the small chamber 37 in an expanded (drawn) state without generation of wrinkles. This structurally prevents generation of breakage of the inner thin film cylinder member 36A, to thereby prolong the service life of the powder sealing device. In addition, even when the processing chamber 12 becomes the negative pressure state, the outer thin film cylinder member 36B is not drawn.

In this embodiment, the thin film cylinder member 36 can be composed of the inner thin film cylinder member 36A and the outer thin film cylinder member 36B which are overlappingly disposed with a gap put therebetween, and accordingly only the inner thin film cylinder member 36A is expandedly sucked in the small chamber 37 by the negative pressure and the outer thin film cylinder member 36B is left as it is. This is effective to improve the appearance characteristic, to increase the strength, and to enhance the reliability.

The powder sealing device in this embodiment can further include the sensor 46 in the gap 45 between the outer thin film cylinder member 36B and the inner thin film cylinder member 36A. With this configuration, when the inner thin film cylinder member 36A is broken and the powder permeates in the gap 45, the powder can be detected by the sensor 46. Consequently, before being inadvertently diffused, the powder leaked in the gap 45 can be positively detected by a light receiving portion of the photosensor, thereby making it possible to detect the powder in a slight amount and hence to improve the detection accuracy. In addition, when the inner thin film cylinder member 36A is broken, the powder is leaked not to the outside of the outer thin film cylinder member 36B but only in the gap 45, so that it is possible to prevent contamination of the inside of the entire facility.

The powder sealing device in this embodiment can further include the discharge port 39 for discharging the powder having entered the small chamber 37. With this configuration, the powder having entered the small chamber 37 can be sequentially discharged through the discharge port 39. This prevents the inner thin film cylinder member 36A from being broken by the weight of the accumulated powder, or prevents the mounting portion from being removed by the weight of the accumulated powder, thereby improving reliability. Moreover, in this embodiment, the shape of the opening portion 32 can be formed in a minimum size corresponding to the operating range of the operating shaft 30. With this configuration, the amount flowing out of the processing chamber 12 to the small chamber 37 can be minimized.

The air used in this embodiment may be replaced with other gases. Although the detector 20 is provided in the path 14, it may be provided on other portions, for example, on the mounting bracket 34. In this case, an opening portion of the detector is formed on an outer peripheral portion (for example, on the upper side) of the mounting bracket, and it is sealingly stuck with a thin rubber. The expanded state of the rubber is detected using a micro limit switch (for example, a metal foil is detected by an overcurrent sensor), to thereby detect a positive pressure state of the processing chamber 12.

While the preferred embodiments of the present invention have been described using specific terms, such description is for illustrative purposes only, and it is to be noted that changes and variations may be made without departing from the spirit or scope of the following claims.

What is claimed is:

1. A powder sealing device of a powder beam processing machine having a processing chamber for processing a workpiece by jetting powder beams to the workpiece comprising:

an opening formed in a peripheral surface of said processing chamber;

an operating shaft located within said opening;

a mounting bracket having a small chamber mounted to said opening such that the opening forms a passage from the small chamber to the processing chamber;

an inner thin film member secured in an opening in the small chamber between a retainer secured around the operating shaft and a wall of the mounting bracket;

whereby when said processing chamber is in a negative pressure state, said inner thin film cylinder member is expandedly sucked inward of said small chamber.

2. A powder sealing device according to claim 1, further comprising an outer thin film member secured between the retainer and the wall of the mounting bracket with a gap between the inner and outer thin film members.

3. A powder sealing device according to claim 2, further comprising a sensor provided in said gap between said outer thin film member and said inner thin film member for detecting powder having entered said gap.

4. A powder sealing device according to claim 1, further comprising a means for discharging the powder having entered said small chamber.

5. A powder sealing device according to claim 1, wherein the size of said opening portion is set at a minimum value corresponding to an operating range of said operating shaft.

6. A powder sealing device of a powder beam processing machine comprising:

a processing chamber having an opening in a peripheral wall;

a small chamber connected to said opening with an operating shaft passing through the opening and the small chamber;

a first thin film member forming a seal over the small chamber between a retainer secured around the operating shaft and a wall of the small chamber, such that when the processing chamber is in a negative pressure state, at least a portion of the first thin film member is sucked inward of said small chamber.

7. The powder sealing device of claim 6, further comprising a second thin film member forming a seal over a gap between the first and second thin film members and wherein the second thin film member is secured between the retainer and the wall of the small chamber.

8. The powder sealing device of claim 7, further comprising a powder sensor in said gap.

* * * * *